United States Patent
Kilmer et al.

(10) Patent No.: US 10,922,249 B2
(45) Date of Patent: Feb. 16, 2021

(54) INPUT/OUTPUT CONTROL CODE FILTER

(71) Applicant: MICROSOFT TECHNOLOGY LICENSING, LLC, Redmond, WA (US)

(72) Inventors: Cymonique Anita Kilmer, Kirkland, WA (US); Conal McGarvey, Seattle, WA (US); Andrew D. Mikesell, Kirkland, WA (US); Sebastian Lerner, Seattle, WA (US); Prashant Chahar, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/248,451

(22) Filed: Jan. 15, 2019

(65) Prior Publication Data

US 2020/0226082 A1   Jul. 16, 2020

(51) Int. Cl.
*G06F 13/20* (2006.01)
*G06F 9/445* (2018.01)
*G06F 9/4401* (2018.01)
*G06F 11/34* (2006.01)
*G06F 11/36* (2006.01)

(52) U.S. Cl.
CPC .......... *G06F 13/20* (2013.01); *G06F 9/44589* (2013.01)

(58) Field of Classification Search
CPC .... G06F 13/20; G06F 9/44589; G06F 9/4411; G06F 11/3485; G06F 11/3684; G06F 11/3688
USPC .................. 710/5, 10, 14, 16, 104
See application file for complete search history.

(56) References Cited

U.S. PATENT DOCUMENTS

| | | | | |
|---|---|---|---|---|
| 5,276,896 A | * | 1/1994 | Rimmer | G06F 13/124 700/3 |
| 5,640,595 A | * | 6/1997 | Baugher | H04L 12/5602 710/10 |
| 5,778,226 A | | 7/1998 | Adams et al. | |
| 6,209,041 B1 | * | 3/2001 | Shaw | G06F 9/5016 719/321 |
| 6,532,535 B1 | * | 3/2003 | Maffezzoni | G06F 11/1458 713/1 |

(Continued)

OTHER PUBLICATIONS

Pitt, Martin, "umockdev: record and mock hardware for debugging and testing," (Feb. 2013) at [https://web.archive.org/web/20130217043512/https://piware.de/2013/02/umockdev-record-and-mock-hardware-for-debugging-and-testing/]. (Year: 2013).*

(Continued)

*Primary Examiner* — Farley Abad
*Assistant Examiner* — Henry W Yu
(74) *Attorney, Agent, or Firm* — Newport IP, LLC; Han Gim

(57) ABSTRACT

Systems and methods are described for verifying functionality of a computing device. A plurality of I/O control codes usable to configure specified actions for a device under test is received. The I/O control codes that were completed without generating an error are determined. The I/O control codes that completed without generating an error and associated binding information are recorded. The I/O control codes that completed without generating an error and associated binding information are stored in a format usable for subsequent replay of the stored I/O control codes.

20 Claims, 9 Drawing Sheets

(56) References Cited

U.S. PATENT DOCUMENTS

| | | | | |
|---|---|---|---|---|
| 6,594,699 B1* | 7/2003 | Sahai | ............ | H04L 29/06027 709/228 |
| 6,971,048 B1* | 11/2005 | Hanson | ............ | G06F 11/3672 714/25 |
| 10,452,420 B1* | 10/2019 | Koryakin | ............ | G06F 9/45558 |
| 2007/0288937 A1 | 12/2007 | Durojaiye et al. | | |
| 2008/0107261 A1* | 5/2008 | Kistner | ............ | G06F 21/6218 380/29 |
| 2009/0276793 A1* | 11/2009 | Cabezas | ............ | G06F 11/2221 719/321 |
| 2013/0086558 A1* | 4/2013 | Merino | ............ | G06F 11/3688 717/128 |
| 2015/0074455 A1* | 3/2015 | Li | ............ | G06F 11/0769 714/15 |

OTHER PUBLICATIONS

"Packet View", Retrieved from: <<https://web.archive.org/web/20150919222638/https://www.hhdsoftware.com/doc/usb-serial-network/packet-view-overview.html>>, Retrieved on: Sep. 19, 2015, 2 Pages.

Graff, et al., "I/O request packets", Retrieved from: <<https://docs.microsoft.com/en-us/windows-hardware/drivers/gettingstarted/i-o-request-packets>>, Apr. 20, 2017, 2 Pages.

Hudek, et al., "Creating IOCTL Requests in Drivers", Retrieved from: <<https://docs.microsoft.com/en-us/windows-hardware/drivers/kernel/creating-ioctl-requests-in-drivers>>, Jun. 16, 2017, 2 Pages.

Hudek, Ted, "Deploying a Driver to a Test Computer", Retrieved from: <<https://docs.microsoft.com/en-us/windows-hardware/drivers/develop/deploying-a-driver-to-a-test-computer>>, Apr. 20, 2017, 3 Pages.

Hudek, et al., "Testing a Driver", Retrieved from: <<https://docs.microsoft.com/en-us/windows-hardware/drivers/develop/testing-a-driver>>, Jun. 28, 2018, 2 Pages.

"Wndows Driver Model—Wikipedia", Retrieved From: https://en.wikipedia.org/w/index.php?title=Windows_Driver_Model&oldid=853699257, Aug. 6, 2018, 5 Pages.

Hudek, et al., "How to Perform Fuzz Tests with IoSpy and IoAttack", Retrieved From: https://docs.microsoft.com/is-is/windows-hardware/drivers/devtest/how-to-perform-fuzz-tests-with-iospy-and-ioattack, Oct. 7, 2018, 2 Pages.

Hudek, et al., "Buffer Descriptions for I/O Control Codes—Windows Drivers : Microsoft Doc", Retrieved From: https://docs.microsoft.com/en-us/windows-hardware/drivers/kernel/buffer-descriptions-for-i-o-control-codes, Jun. 16, 2017, 2 Pages.

Hudek, et al., "IoSpy—Windows Drivers : Microsoft Docs", Retrieved From: https://docs.microsoft.com/en-us/windows-hardware/drivers/devtest/iospy#iospy-data-file, Jul. 9, 2018, 3 Pages.

Hudek, et al., "IoSpy and IoAttack—Wndows Drivers I Microsoft Docs", Retrieved From: https://docs.microsoft.com/en-us/windows-hardware/drivers/devtest/iospy-and-ioattack, Oct. 7, 2018, 2 Pages.

Hudek, et al., "Types of WDM Drivers—Windows drivers I Microsoft Docs", Retrieved From: https://docs.microsoft.com/en-us/windows-hardware/drivers/kernel/types-of-wdm-drivers, Jun. 16, 2017, 3 Pages.

Hudek, et al., "IoAttack—Windows Drivers : Microsoft Docs", Retrieved From: https://docs.microsoft.com/en-us/windows-hardware/drivers/devtest/ioattack, Jul. 10, 2018, 2 Pages.

"International Search Report and Written Opinion Issued in PCT Application No. PCT/US20/012283", dated Apr. 15, 2020, 14 Pages.

* cited by examiner

INPUT/OUTPUT CONTROL CODE FILTER

BACKGROUND

Computing devices today have an increasing number of attached and installed peripheral devices. In order to interface to such peripherals, the computing device typically runs a device driver to operate or control each type of device. Device drivers typically run in kernel space. An input/output control (IOCTL) interface may be provided to allow the user space to communicate with device drivers. An IOCTL is a system call for device-specific input/output and other operations. An IOCTL may include a request code that is specific to the device under test.

Testing of various such devices may involve the calling of many hundreds or thousands of IOCTLs. Many devices are complex and can include a large number of settings and inputs, thereby dramatically increasing the scope of potential parameters, test interfaces, and performance metrics. Furthermore, if tests are not repeatable and relevant to settings of interest, the use of IOCTLs to achieve test objectives may be extremely inefficient. Inefficient use of IOCTLs may result in inefficiencies with respect to computing resources. It is with respect to these considerations and others that the disclosure made herein is presented

SUMMARY

Disclosed herein are methods and systems for efficiently verifying functionality of a computing device and associated devices using codes such as IOCTLs. In various embodiments, an I/O filter function may be implemented that is configured to identify and capture relevant device I/O control codes (IOCTLs) and I/O request packets (IRPs) that enter or leave a device node for one or more devices under test. In an embodiment, an IRP may be a basic unit of work for a device node (devnode) in some operating systems, such as the Windows Operating System. In one embodiment, the I/O filter function may be used to discover which device IOCTLs and IRPs cause the driver and/or device to perform a specific action and that does not return an error. The relevant IOCTLs and IRPs may be recorded to a file which can be read and executed by a device fundamentals or system fundamentals test to replay the recorded relevant IOCTLs and IRPs for the same device or a similar device. By recording the relevant IOCTLs and IRPs and allowing the recording to be reused, time and machine cycles may be saved because only the meaningful IOCTLs and IRPs may be executed rather than all possible IOCTLs and IRPs.

For a given device and/or driver, there may be millions of potential IOCTLs and IRPs that may be called, even when the device is not configured with all possible features that need to be tested. By recording the relevant IOCTLs and IRPs for a given device, driver, and a desired set of conditions, subsequent test activity can use the recorded IOCTLs and IRPs to test the same or similar device or class of device. This may allow the tester to save a considerable amount of time and effort attempting to recreate testing for a device, which can lead to extensive and unnecessary consumption of computing resources.

In some embodiments, a filter device object (FiDO) may be installed on the device under test (DUT) that is configured to record IOCTLs and IRPs to a data file with target binding information. Additionally, an activation function may be included that enables and disables the filter device object installed on the DUT. A test function may be configured to execute IOCTLs and IRPs for one or more DUTs. In some embodiments, a replay function may be configured to playback successfully processed IRPs or IOCTLs. In some embodiments, a toolkit may be included that is configured to merge and/or modify data and target binding files.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
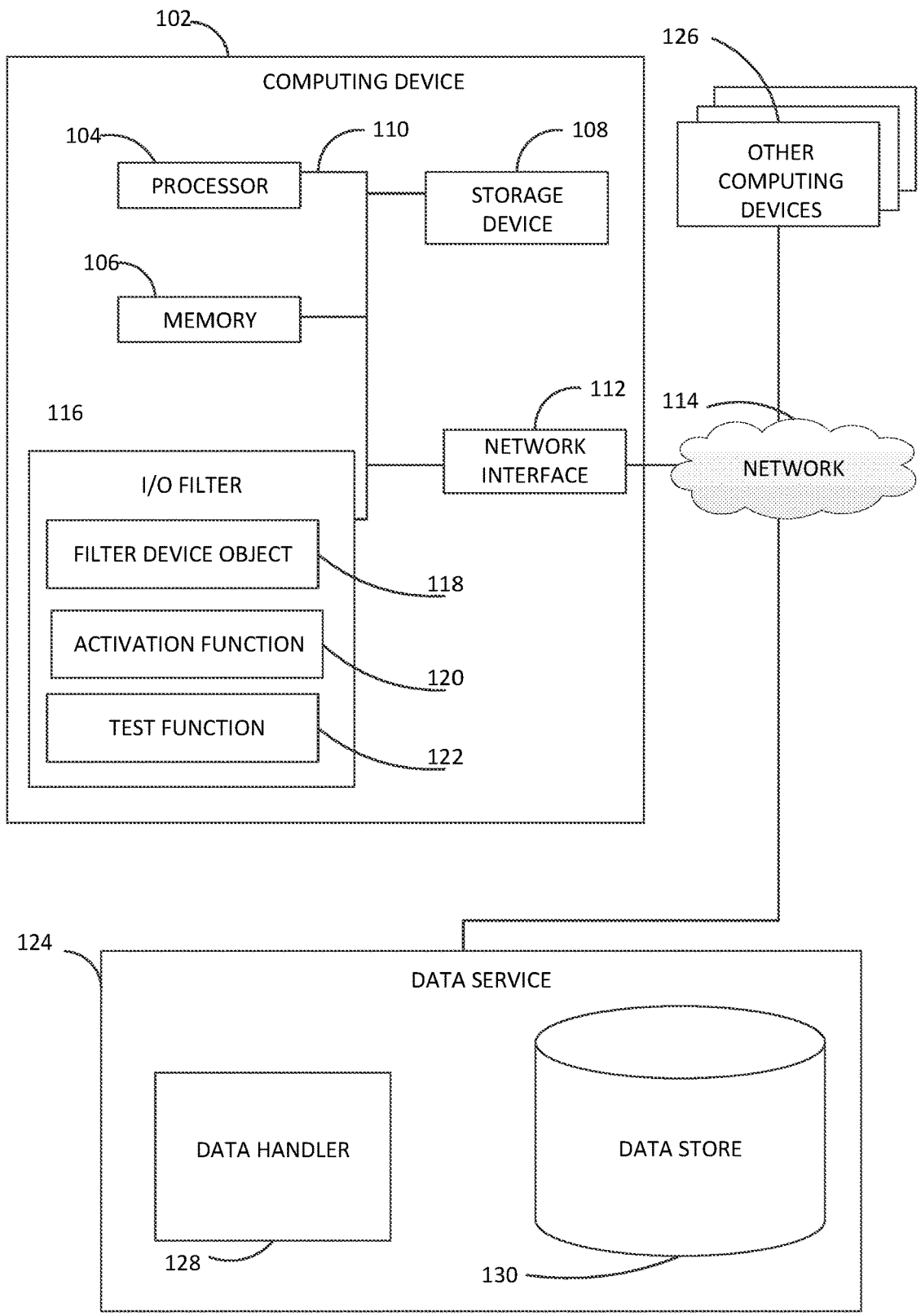
FIG. 1 is a diagram illustrating an example system configured to capture relevant device I/O control codes (IOCTLs) and I/O request packets (IRPs) in accordance with the present disclosure.

A computing device may have an installed set of devices such as cameras and audio speakers. Numerous computing settings can be adjusted on these devices. For example, hardware settings and network settings may be configured differently for a given computing device. Because of the sheer number and variety of device configurations, it can be difficult to test and verify all of the components and software, let alone characterize the performance of the computing devices with respect to specific metrics. When a device driver encounters a service issue, troubleshooting the issue can be a complex process due to the amount of data that must be evaluated. Even when the cause of a problem is found, the loss of use of the computing device may result in lost data, down time, and customer dissatisfaction.

Development and verification of devices and their drivers is a complex task. Proper testing of device drivers is important to ensuring a high-quality installation and user experience with a particular driver. Exhaustively executing tests that encompass all configurations that are possible for a driver is difficult and is typically not possible prior to release of the product.

The following detailed description is directed to technologies for identifying and capturing relevant device I/O control codes (IOCTLs) and I/O request packets (IRPs) that enter or leave a device node for one or more devices under test. In the examples described herein, providing device driver assessment is one example scenario in which the described embodiments can be implemented. However, the described concepts can apply generally to other computing components and services.

In various embodiments, an I/O filter function may be implemented that is configured to identify and capture relevant device I/O control codes (IOCTLs) and I/O request packets (IRPs) that enter or leave a device node for one or more devices under test.

In some embodiments, the I/O filter function may be used in conjunction with tools and processes that perform IOCTL tests on kernel-mode drivers. In one example, the tools and processes may also perform Windows Management Instrumentation (WMI) fuzz tests. For example, the I/O filter function may be used in conjunction with tools to ensure that a driver's IOCTL code validates data buffers and buffer lengths correctly and thus avoid buffer overruns that can lead to system instability. In some contexts, fuzz testing presents a driver with random data in order to uncover bugs or defects within the driver.

In one embodiment, the I/O filter function may be used to discover which device IOCTLs and IRPs cause the driver and/or device to perform a specific action and that does not return an error. These IOCTLs and IRPs may be recorded to a file which can be read and executed by a device fundamentals or system fundamentals test to replay the relevant IOCTLs and IRPs for the same device or a similar device. By recording the relevant IOCTLs and IRPs and allowing them to be reused, time and machine cycles may be saved because only the meaningful IOCTLs and IRPs may be executed rather than all or random IOCTLs and IRPs. Additionally, by providing such a I/O filter function and improving test efficiency, driver errors can be more quickly identified and corrected before the errors can significantly impact the end user experience. The techniques described herein include an executable module local to the computing device. The executable module may be referred to herein as a filter device object which may be part of the I/O filter function. The filter device object may generate a data object in-memory. In some embodiments, the data object may be compressed and encrypted for transport across networks including non-secure network paths.

FIG. 1 is a block diagram of an example of a computing system configured to capture relevant device I/O control codes (IOCTLs) and I/O request packets (IRPs). The computing system may include a computing device 102. The computing device 102 may be, for example, a laptop computer, desktop computer, or tablet computer, among others. The computing device 102 may include a processor 104 that is adapted to execute stored instructions, as well as a memory unit 106 that stores instructions that are executable by the processor 102. The memory unit 106 may be non-persistent memory in relation to a storage device 108 that may include a hard disk drive for example. The processor 104 can be a single core processor, a multi-core processor, a computing cluster, or any number of other configurations. The memory unit 106 can include random access memory (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.)), flash memory, or any other suitable memory systems. The instructions that are executed by the processor 104 may be used to collect device driver data.

The processor 104 may be connected through a system bus 110 (e.g., PCI, ISA, PCI-Express, NuBus, etc.) to network interface 112 may also be adapted to connect the computing system 100 through the system bus 106 to a network 114.

The storage 108 can include a hard drive, an optical drive, a USB flash drive, an array of drives, or any combinations thereof. A I/O filter 116 may be, in some cases, executable instructions to be stored in the storage device 108. In some cases, the I/O filter 116 may be implemented as logic, at least partially comprising hardware logic. The I/O filter 116 may include submodules including filter device object 118, activation function 120, and a test function 122. Although FIG. 1 illustrates each of the modules 118, 120, and 122 as being submodules of the I/O filter 116, each of the modules 116, 118, 120, and 122 may be implemented as discrete components, or as components of a broader process, or logical hardware construct.

The I/O filter 116 may be configured to record IOCTLs and IRPs to a data file with target binding information and generate a data object stored in a memory unit of the computing device 102. In some cases, the I/O filter 116 may be configured to provide communication over the network 114 to a data service 124 which may correspond to an IOCTL and IRP data collection service.

The I/O filter 116 may be configured to generate a data object stored in a memory unit, such as the memory unit 106, of the computing device 102 based on the collected data.

The data object stored in the memory unit 106 may include a delimited list. The data object may include multiple delimited sections embedded into a single file. The multiple sections of driver data may be extracted out as separate delimited files. The multiple delimited lists may each related to different classes or types of devices.

In some embodiments, I/O filter 116 may be deployed upon operation of one or more operations provided via the data service 124. In some cases, the I/O filter 116 may be embedded into an operating system (OS) of the computing device 102. In this scenario, an OS may initiate operations of the I/O filter 116.

The computing device 102 may communicate with other networked devices, such as one or more networked computing devices 126. The networked computing devices 126 may be implemented similar to the computing device 102 and may also include the I/O filter 116 local to each device. Recorded device I/O control codes (IOCTLs) and I/O request packets (IRPs) may be provided to the data service 124 for analysis by a data handler 128. The data handler 128 may be implemented as logic, at least partially including hardware logic, software, firmware, or any combination thereof. The data handler 128 may be configured to decrypt and decompress the recorded device I/O control codes (IOCTLs) and I/O request packets (IRPs) data, as well as decompose the combined delimited file into dimensions of data associated with each of the multiple delimited files in the combined delimited file. Data may be stored in a data store, such as the data store 120 of the data service 124. The recorded device I/O control codes (IOCTLs) and I/O request packets (IRPs) data provided to the data center 124 may be used to update current recorded data.

It is to be understood that the block diagram of FIG. 1 is not intended to indicate that a computing system is to include all of the components shown in FIG. 1. Rather, the computing system can include fewer or additional components not illustrated in FIG. 1 (e.g., additional applications, additional modules, additional memory devices, additional network interfaces, etc.). Furthermore, any of the functionalities of the filter device object 118, activation function 120, and test function 122 may be partially, or entirely, implemented in hardware and/or in the processor 104. For example, the functionality may be implemented with an application specific integrated circuit, in logic implemented in the processor 104, or in any other device.

In an embodiment, the I/O filter may be configured to create an upper filter device object (FiDO) that records data pertaining to IOCTLs and IRPs made to the kernel-mode device or device node/DUT. In some embodiments, the FiDO may be configured to record read and write requests.

Figure 2:
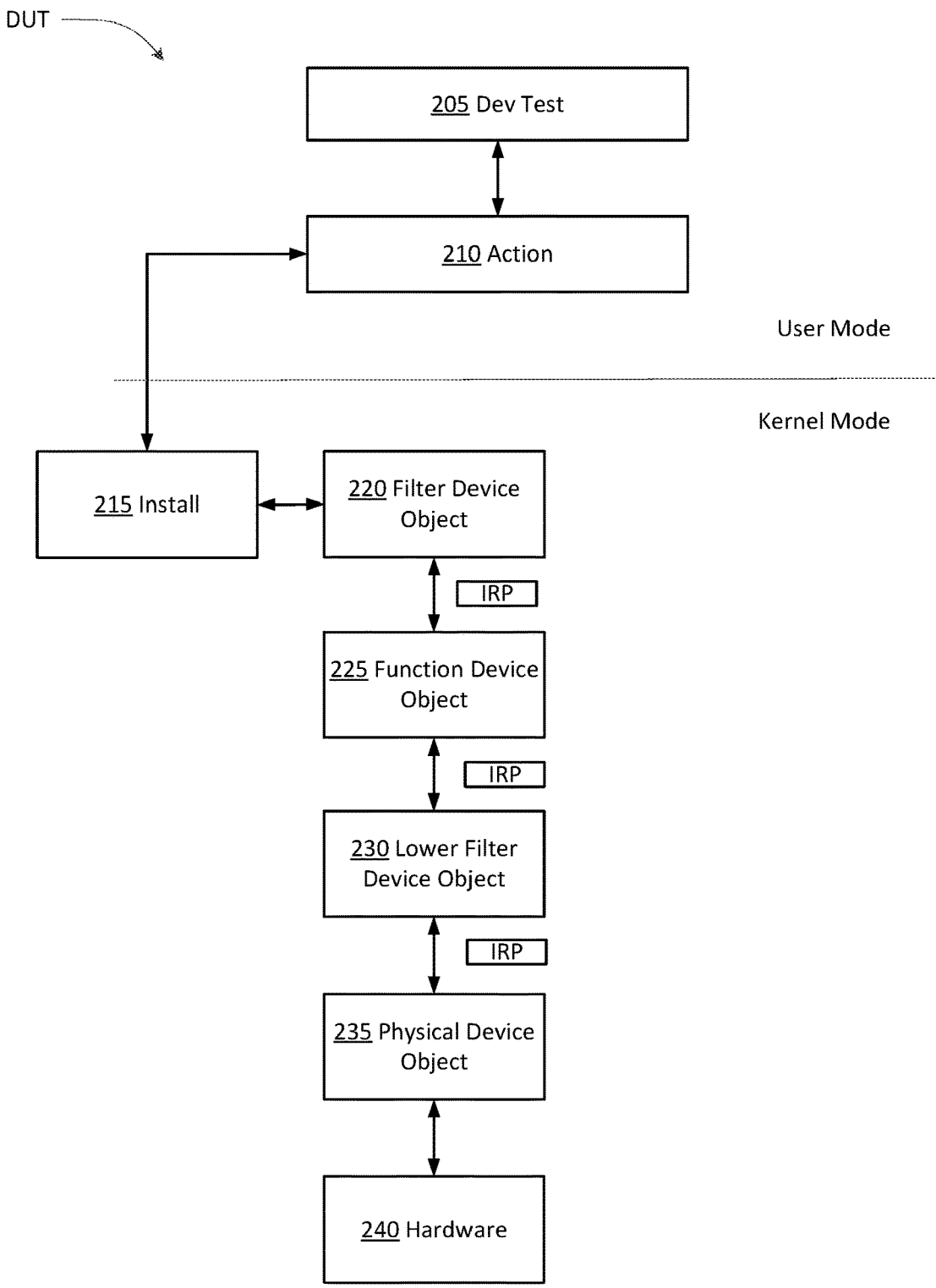
FIG. 2 illustrates an example filter driver enabled on a DUT.

As discussed, the I/O filter may include an activation function that may be configured to install the upper FiDO on one or more DUTs. A device query (DQ) parameter may control which DUT(s) the filter driver's FiDO is installed on. FIG. 2 illustrates an example of how the filter driver may be enabled on a DUT and the device stack after the FiDO has been installed. A DUT may run a development test or utility 205 which may invoke an action 210. An install 215 may be invoked to install a filter device object 220 which includes a function device object 225, lower filter device object 230, and a physical device object 235 that corresponds to hardware 240.

The recording or training phase may be longer than the playback phase as IOCTLs and IRPs are sent to the DUT. In this phase, the IOCTLs and IRPs that the DUT succeeded may be identified and this information may be written to a data file specific to the DUT. In this way, the filter driver determines which IOCTLs and IRPs are relevant to the device. In other words, the relevant IOCTL or IRPs are the ones that cause the device or driver to perform some action besides simply return an error.

Figure 3:
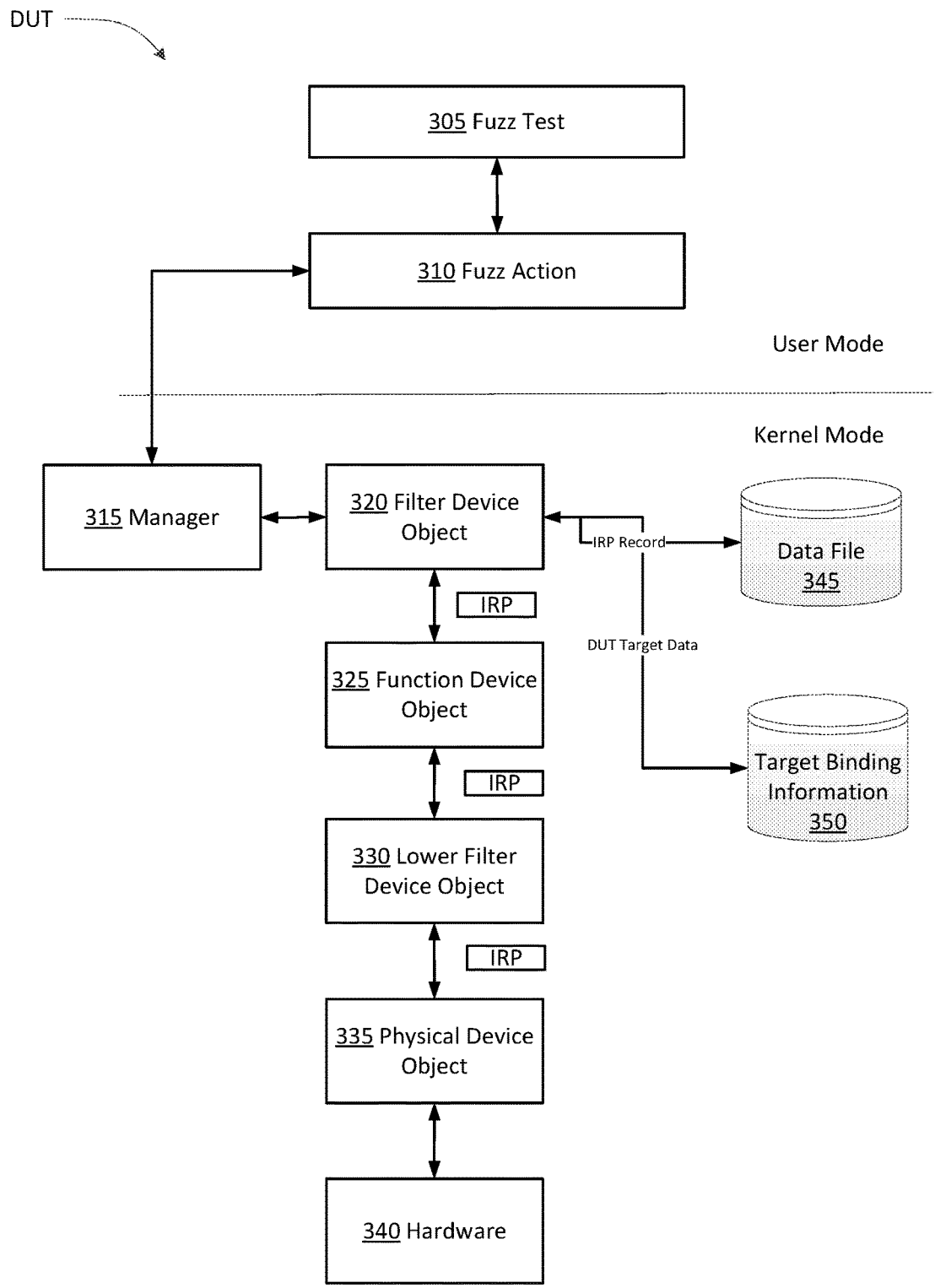
FIG. 3 illustrates a filter driver configured to record IRP and IOCTL processing for a DUT.

In one embodiment, the filter driver may collect data for the following two IRP major function codes (IRP_MJ_*):
   #define IRP_MJ_DEVICE_CONTROL 0x0e
   #define IRP_MJ_SYSTEM_CONTROL 0x17//WMI
When the IRP is being passed down the devnode for the DUT, the filter driver may record the following details about the IRP to a data file for later use:
   1. The Device I/O Control Code described stored in the IRP: IrpSp→Parameters.DeviceIoControl.IoControlCode
   2. The input buffer length stored in the IRP: IrpSp→Parameters.DeviceIoControl.InputBufferLength
   3. The input buffer
   4. The output buffer length stored in the IRP: IrpSp→Parameters.DeviceIoControl.OutputBufferLength
   5. The output buffer
When the IRP is being processed back up the devnode, the filter driver may record the following details:
   1. The IRP final Status: Irp→IoStatus.Status
   2. The returned length stored in the IRP: Irp→IoStatus.Information FIG. 3 illustrates how the filter driver records IRP and IOCTL processing for a DUT. A fuzz test utility 305 may be run that causes at least one fuzz action 310 that may generate one or more IOCTLS and/or IRPs. An I/O manager or controller 315 may send the IOCTLS and/or IRPs to filter device object 320 which includes a function device object 325, lower filter device object 330, and a physical device object 335 that corresponds to hardware 340. Selected IOCTLS and/or IRPs may be sent to and stored in data file 345, and associated target binding information may be stored in data store 350.

When a data file and binding information are available for a given device under test, a playback function may be used to playback the IOCTLS and IRPs to any number of DUTs on any number of systems.

Figure 4:
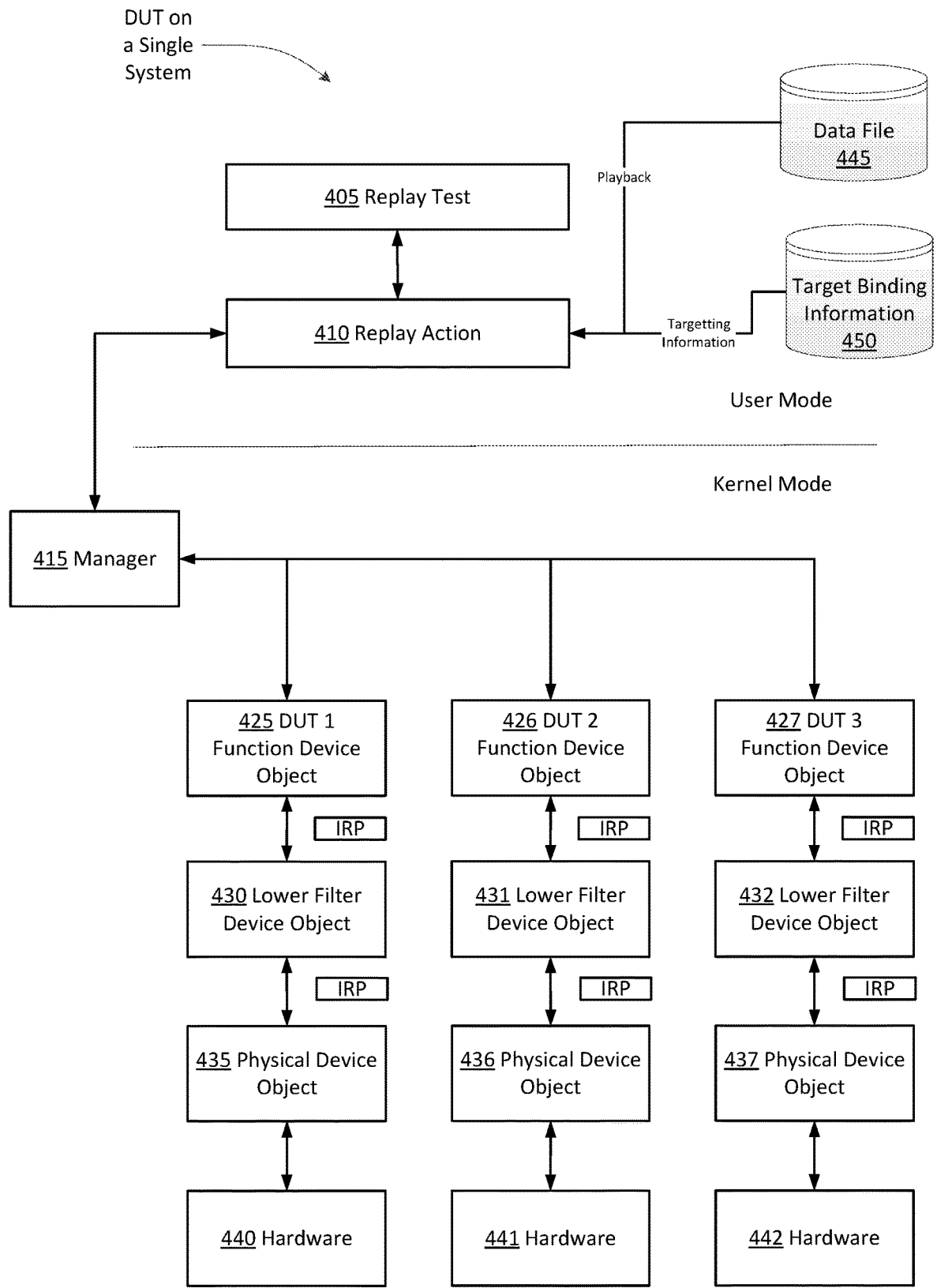
FIG. 4 illustrates playback for multiple DUTs on a single system.

FIG. 4 illustrates an example of playback for multiple DUTs on a single system. A replay test utility 405 may be run that causes at least one replay action 410 that may be received from data file 445 and target binding information 450. The received data file(s) may include one or more IOCTLS and/or IRPs that were previously recorded during a fuzz test. An I/O manager or controller 415 may send the IOCTLS and/or IRPs to filter device object 425 for DUT 1, which includes lower filter device object 430, and a physical device object 435 that corresponds to hardware 440. I/O manager or controller 415 may further send the IOCTLS and/or IRPs to filter device object 426 for DUT 2, which includes lower filter device object 431, and a physical device object 436 that corresponds to hardware 441. I/O manager or controller 415 may further send the IOCTLS and/or IRPs to filter device object 427 for DUT 3, which includes lower filter device object 421, and a physical device object 437 that corresponds to hardware 442.

Figure 5:
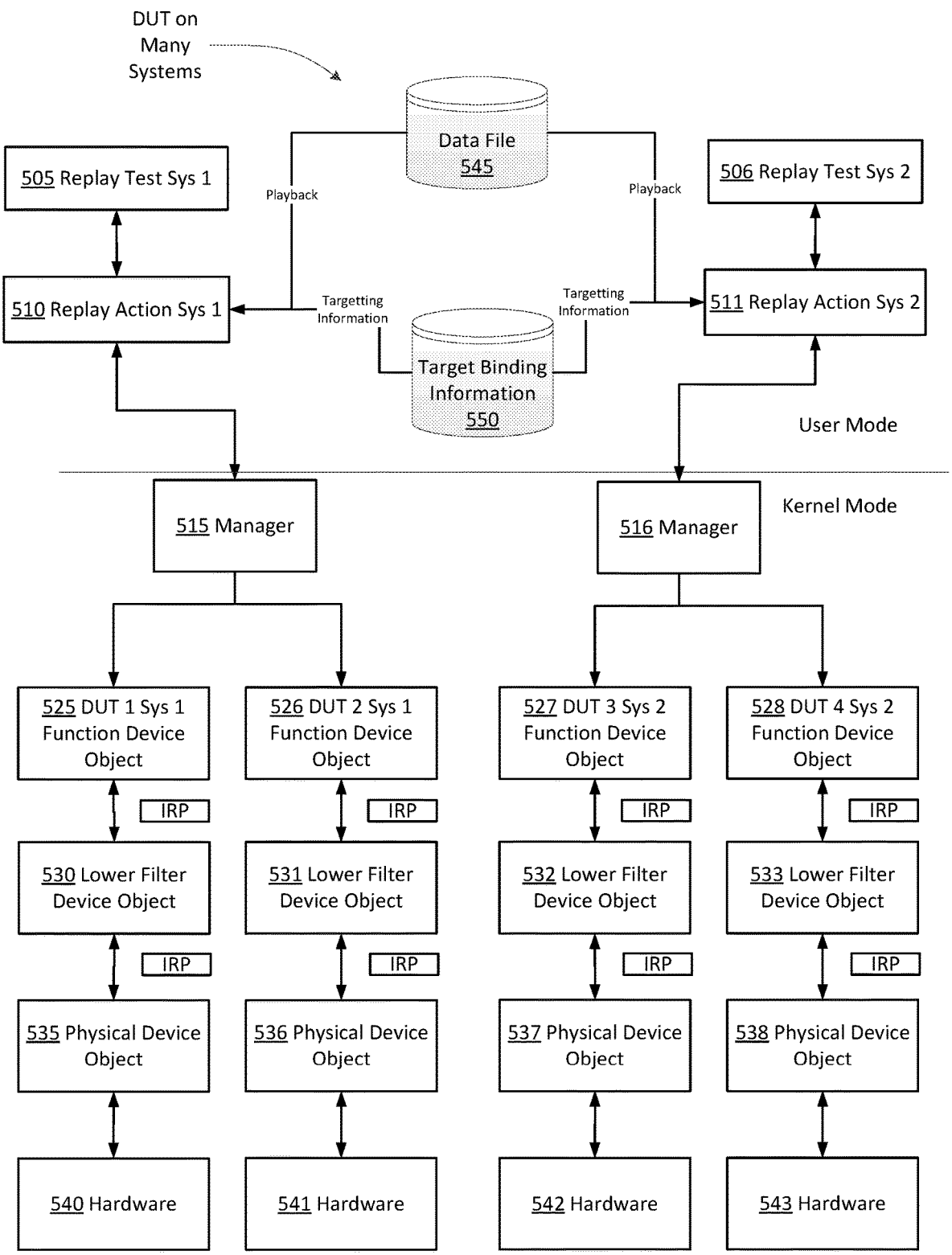
FIG. 5 illustrates playback for many DUTs on many systems.

FIG. 5 illustrates an example of playback for many DUTs on many systems. A replay test utility 505 for system 1 may be run that causes at least one replay action 510 for system 1 that may be received from data file 545 and target binding information 550. The received data file(s) may include one or more IOCTLS and/or IRPs that were previously recorded during a fuzz test. An I/O manager or controller 515 may send the IOCTLS and/or IRPs to filter device object 525 for DUT 1 of system 1, which includes lower filter device object 530, and a physical device object 535 that corresponds to hardware 540. The I/O manager or controller 515 may further send the IOCTLS and/or IRPs to filter device object 526 for DUT 2 of system 1, which includes lower filter device object 531, and a physical device object 536 that corresponds to hardware 541.

A replay test utility 506 for system 2 may be run that causes at least one replay action 511 for system 2 that may be received from data file 545 and target binding information 550. The received data file(s) may include one or more IOCTLS and/or IRPs that were previously recorded during a fuzz test. An I/O manager or controller 516 may send the IOCTLS and/or IRPs to filter device object 527 for DUT 3 of system 2, which includes lower filter device object 532, and a physical device object 537 that corresponds to hardware 542. The I/O manager or controller 516 may further send the IOCTLS and/or IRPs to filter device object 528 for DUT 4 of system 2, which includes lower filter device object 533, and a physical device object 538 that corresponds to hardware 543.

By implementing the filter driver functions as disclosed herein, a data file and a binding file may be generated that can be used to reproduce a bug on a remote machine with the same hardware configuration as the system on which the files were generated. This file can also be used to test a DUT without having to exhaustively running IOCTL or IRPs or any simple I/O plugins on the machine, thus greatly reducing the setup requirements. Additionally, the replay of the IOCTLs or IRPs may be performed more quickly than the original exhaustive set of IOCTLs or IRPs that were sent to the DUT.

In some embodiments, the data file and binding file can be modified to run on similar devices that are part of the same device class. Additionally, the data file can be used to playback the IOCTL or IRPs to any number of DUTs on single system. The data file can also be used to playback the IOCTL or IRPs to any number of DUTs on multiple systems.

In some embodiments, system providers may reuse the data files to test device classes for which plug-ins are not available. For example, the data files may be reused by software toolsets and test automation frameworks for the development of device drivers. The data files may be shared via the various hardware kits with third party developers and other parties. Third parties may also be allowed to modify the binding data so that they can be replayed or security testing can be performed on similar devices of the same device setup class.

In some embodiments, the data files may be used to determine when all IOCTLs supported by the DUT have been covered by one or more tests.

In some embodiments, the data files may be used to perform security testing (e.g. IOCTL buffer attacks) on any number of DUTs. In some embodiments, training data may be collected from many machines and shared with third parties to shorten the time required for security testing.

In some embodiments, multiple data files may be merged for a given DUT or class of DUTs. Additionally, IOCTL entries may be removed from the data file. To allow for analysis and assessment when running a test, a mechanism for viewing and editing the data files can be provided. The filter driver may be configured to target specific classes of drivers (e.g., audio, NDIS, camera).

In some embodiments, the computing device may operate in a learning mode where successfully executed IOCTLs and IRPs are collected and a baseline profile is created.

Figure 6:
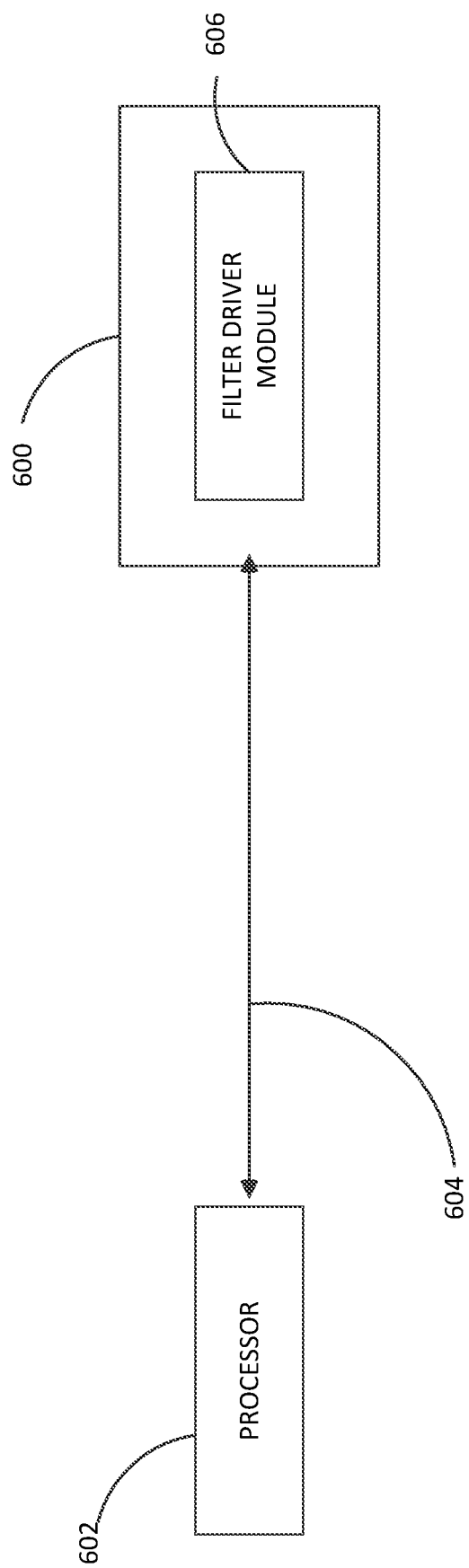
FIG. 6 illustrates an example computer-readable storage medium in accordance with the present disclosure.

FIG. 6 is a block diagram of an example computer-readable storage media for recording IOCTLs and IRPs. The tangible and non-transitory computer-readable storage media 600 may be accessed by a processor 602 over a computer bus 604. Furthermore, the tangible and non-transitory computer-readable storage media 600 may include code to direct the processor 602 to perform the steps of the described methods.

The various software components discussed herein may be stored on the tangible and non-transitory computer-readable storage media 600, as indicated in FIG. 6. For example, the tangible and non-transitory computer-readable storage media 600 can include a filter driver module 606 for collection of IOCTLs and IRPs for a DUT. The filter driver module 606 can also generate a data object stored in a memory unit of the networked device based on the collected IOCTL and IRP data. The may be transmitted to a destination device. The data may also be compressed and encrypted.

Figure 7:
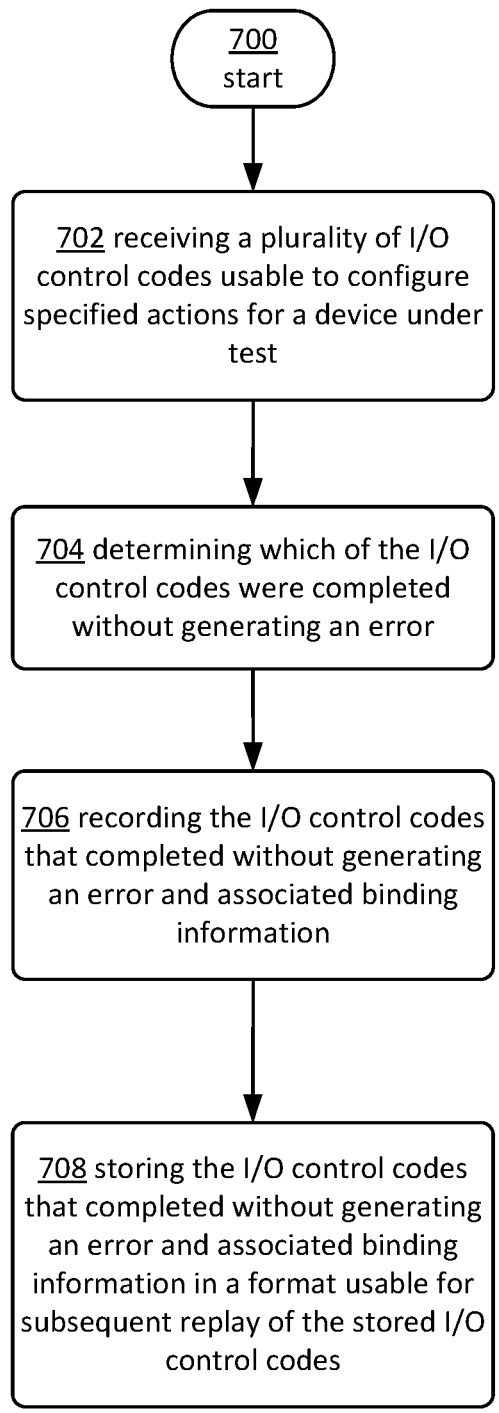
FIG. 7 is a flowchart depicting an example procedure in accordance with the present disclosure.

FIG. 7 illustrates an example operational procedure for verifying functionality of a computing device. In an embodiment, the procedure can be implemented at least in part in a system or function on a computing device corresponding to FIG. 1.

Referring to FIG. 7, operation 700 begins the operational procedure. Operation 700 may be followed by operation 702. Operation 702 illustrates receiving a plurality of I/O control codes usable to configure specified actions for a device under test. Operation 702 may be followed by operation 704. Operation 704 illustrates determining which of the I/O control codes were completed without generating an error. Operation 704 may be followed by operation 706. Operation 706 illustrates recording the I/O control codes that completed without generating an error and associated binding information.

Operation 706 may be followed by operation 708. Operation 708 illustrates storing the I/O control codes that completed without generating an error and associated binding information in a format usable for subsequent replay of the stored I/O control codes.

Figure 8:
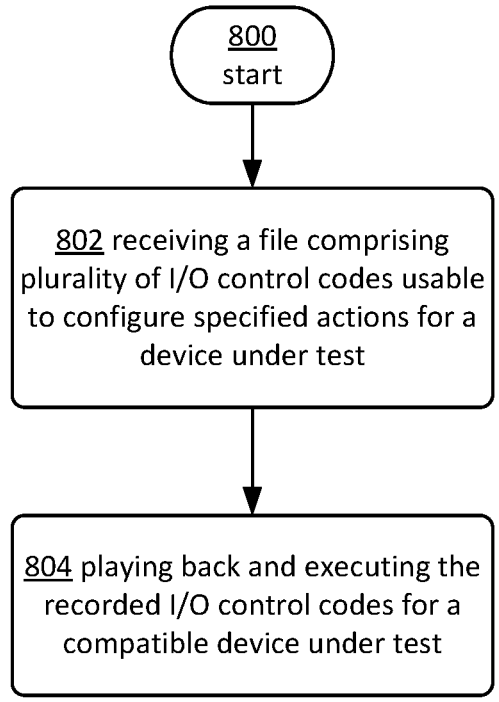
FIG. 8 is a flowchart depicting an example procedure in accordance with the present disclosure.

FIG. 8 illustrates an example operational procedure for verifying functionality of a computing device. In an embodiment, the procedure can be implemented at least in part in a system or function on a system corresponding to FIG. 1.

Referring to FIG. 8, operation 800 begins the operational procedure. Operation 800 may be followed by operation 802. Operation 802 illustrates receiving a file comprising plurality of I/O control codes usable to configure specified actions for a device under test. In an embodiment, the I/O control codes were previously recorded based on a determination that the codes were completed by a test utility for the device under test without generating an error. Operation 802 may be followed by operation 804. Operation 804 illustrates playing back the recorded I/O control codes for a compatible device under test.

Figure 9:
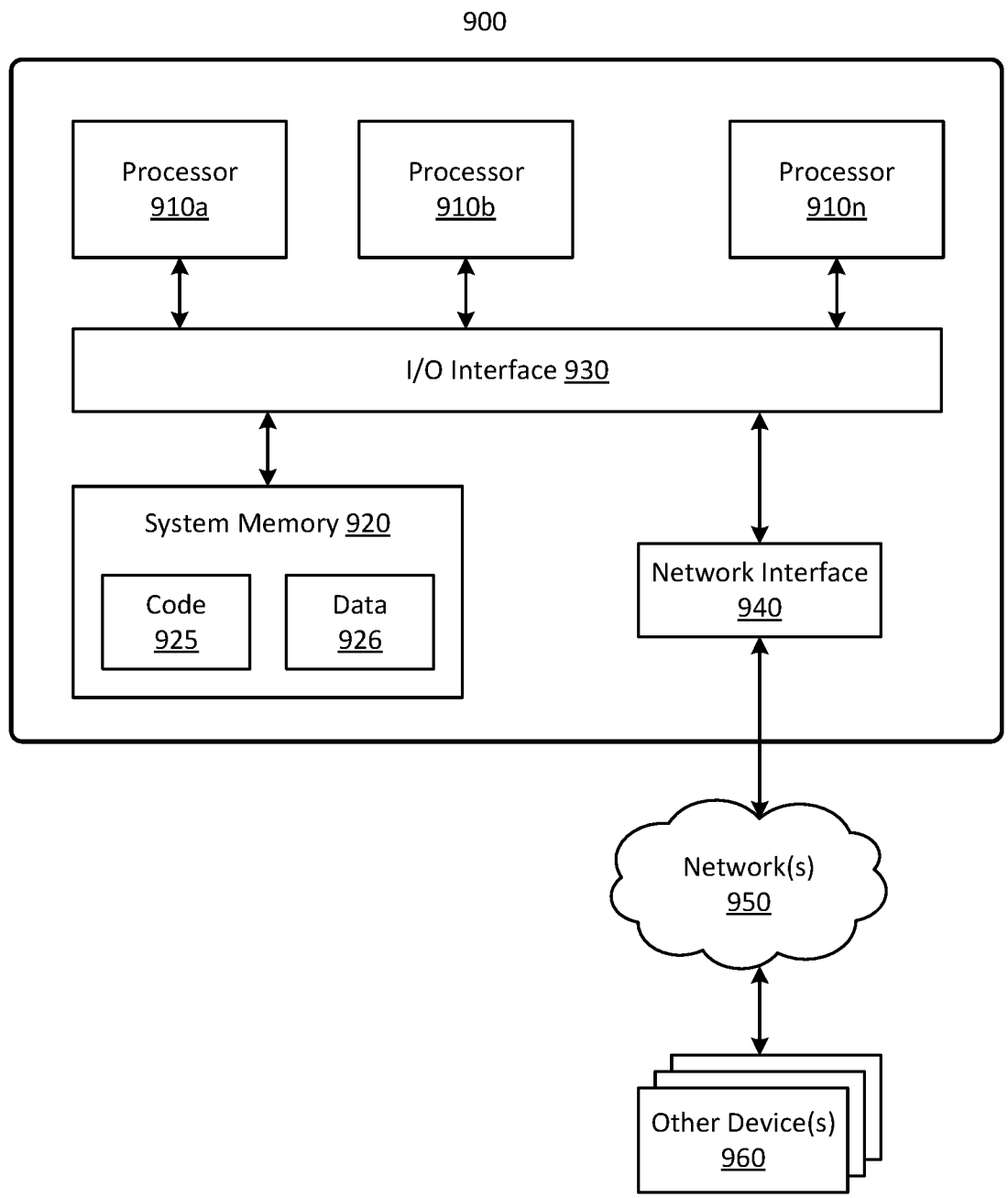
FIG. 9 is an example computer system that may be used in some embodiments.

In at least some embodiments, a computing device that implements a portion or all of one or more of the technologies described herein, including the techniques to implement the functionality of a device may include a general-purpose computer system that includes or is configured to access one or more computer-accessible media. FIG. 9 illustrates such a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 1 through 11, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 920 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

A network set up by an entity, such as a company or manufacturer, to provide one or more services (such as various types of cloud-based analytics services) accessible via the Internet and/or other networks to a distributed set of clients may be termed a service provider. Such a provider network may include numerous data centers hosting various resource pools, such as collections of physical and/or virtualized computer servers, storage devices, networking equipment, and the like, needed to implement and distribute the infrastructure and services offered by the service provider.

A number of different types of computing devices may be used singly or in combination to implement the resources of the service provider in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

As used herein, the phrase "configured to" may encompass any way that any kind of structural component can be constructed to perform an identified operation. The structural component can be configured to perform an operation using software, hardware, firmware and the like, or any combinations thereof. The term "logic" may encompass any functionality for performing a task. For instance, each operation illustrated in the flowcharts corresponds to logic for performing that operation. An operation can be performed using software, hardware, firmware, physical electronic circuits, and the like, or any combinations thereof. The terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein encompasses the subject matter set forth in the following example clauses.

Example 1

A computer-implemented method for verifying functionality of a computing device, the method comprising: receiving a plurality of I/O control codes usable to configure specified actions for a device under test; determining which of the I/O control codes were completed without generating an error; recording the I/O control codes that completed without generating an error and associated binding information; and storing the I/O control codes that completed without generating an error and associated binding information in a format usable for subsequent replay of the stored I/O control codes.

Example 2

The method according to Example 1, further comprising recording I/O request packets that completed without generating an error.

Example 3

The method according to any one of Examples 1 or 2, further comprising replaying the recorded I/O control codes.

Example 4

The method according to any one of Examples 1 to 3, further comprising replaying the recorded I/O control codes for a different device under the same class.

Example 5

The method according to any one of Examples 1 to 4, wherein the recording is performed by a recording executable module that is local to the device under test.

Example 6

The method according to any one of Examples 1 to 5, further comprising storing an input buffer length stored in the I/O request packets.

Example 7

The method according to any one of Examples 1 to 6, further comprising storing an input buffer.

Example 8

The method according to any one of Examples 1 to 7, further comprising storing an output buffer length stored in the I/O request packets.

Example 9

The method according to any one of Examples 1 to 8, further comprising storing an output buffer.

Example 10

The method according to any one of Examples 1 to 9, further comprising storing a final status of the I/O request packets.

Example 11

The method according to any one of Examples 1 to 10, further comprising storing a returned length stored in the I/O request packets.

Example 12

A system configured to verify functionality of a computing device, the system comprising: at least one memory having stored therein computer instructions that, upon execution by one or more processors of the system, at least cause the system to: receive a file comprising a plurality of I/O control codes usable to configure specified actions for a device under test, wherein the I/O control codes were previously recorded based on a determination that the codes were completed by a test utility for the device under test without generating an error; and play back and execute the I/O control codes for a compatible device under test.

Example 13

The system of Example 12, further comprising computer instructions that, upon execution by one or more processors of the system, at least cause the system to play back the I/O control codes in parallel for a plurality of compatible devices under test.

Example 14

The system of any one of Examples 12 to 13, further comprising computer instructions that, upon execution by one or more processors of the system, at least cause the system to render an interface configured to allow a user to edit the I/O control codes.

Example 15

The system of any one of Examples 12 to 14, further comprising computer instructions that, upon execution by one or more processors of the system, at least cause the system to render an interface configured to allow a user to merge the I/O control codes.

Example 16

A computer-readable storage medium having computer-executable instructions stored thereupon which, when executed by one or more processors of a computing device, cause the computing device to perform operations comprising: running a plurality of I/O control codes to cause specified actions for a device under test; recording I/O control codes that completed without generating an error; and storing the I/O control codes that completed without generating an error and associated binding information in a format usable for subsequent replay of the stored I/O control codes.

Example 17

The computer-readable storage medium of Example 16, further comprising computer-executable instructions stored thereupon which, when executed by one or more processors of a computing device, cause the computing device to perform operations comprising recording I/O request packets that completed without generating an error.

Example 18

The computer-readable storage medium of any one of Examples 16 to 17, further comprising computer-executable instructions stored thereupon which, when executed by one or more processors of a computing device, cause the computing device to perform operations comprising storing an input buffer length stored in the I/O request packets.

Example 19

The computer-readable storage medium of any one of Examples 16 to 18, further comprising computer-executable instructions stored thereupon which, when executed by one or more processors of a computing device, cause the computing device to perform operations comprising further comprising storing an input buffer.

Example 20

The computer-readable storage medium of any one of Examples 16 to 19, further comprising computer-executable instructions stored thereupon which, when executed by one or more processors of a computing device, cause the computing device to perform operations comprising further comprising storing an output buffer length stored in the I/O request packets and the output buffer.

What is claimed is:

1. A computer-implemented method for verifying functionality of one or more device drivers running on a computing device, wherein the device drivers are accessible via an input/output control (IOCTL) that executes a system call for device-specific operations for a device under test that is controlled by the device drivers, the method comprising:
receiving a plurality of IOCTLs usable to configure, from user space, specified system calls to be executed in kernel space for the device under test, the system calls directed to the one or more drivers associated with the device under test;
executing a filter function configured to determine which of IOCTLs were completed without generating an error and caused the driver to perform a specified function, thereby indicating that the specified function is installed and available in the device under test;
recording the IOCTLs and associated binding information that perform a specified action without generating an error; and
storing the IOCTLs that completed without generating an error and associated binding information in a format usable for subsequent replay of the stored IOCTLs.

2. The method according to claim 1, further comprising recording I/O request packets that completed without generating an error.

3. The method according to claim 1, further comprising replaying the recorded IOCTLs.

4. The method according to claim 3, further comprising replaying the recorded IOCTLs for a different device under the same class.

5. The method according to claim 1, wherein the recording is performed by a recording executable module that is local to the device under test.

6. The method according to claim 2, further comprising storing an input buffer length stored in the I/O request packets.

7. The method according to claim 1, further comprising storing an input buffer.

8. The method according to claim 2, further comprising storing an output buffer length stored in the I/O request packets.

9. The method according to claim 1, further comprising storing an output buffer.

10. The method according to claim 2, further comprising storing a final status of the I/O request packets.

11. The method according to claim 2, further comprising storing a returned length stored in the I/O request packets.

12. A system configured to verify functionality of one or more device drivers running on a computing device, wherein the device drivers are accessible via an input/output control (IOCTL) that executes a system call for device-specific operations for a device under test that is controlled by the device drivers, the system comprising:
at least one memory having stored therein computer instructions that, upon execution by one or more processors of the system, at least cause the system to:
receive a file comprising a plurality of IOCTLs usable to configure, from user space, specified system calls to be executed in kernel space for the device under test, the system calls directed to one or more drivers associated with the device under test, wherein the IOCTLs were previously recorded based on a determination that the IOCTLs were completed by a test utility for the device under test without generating an error and caused the one or more drivers to perform a specified function, thereby indicating that the specified function is installed and available in the device under test; and
play back and execute the IOCTLs for a compatible device under test.

13. The system of claim 12, further comprising computer instructions that, upon execution by one or more processors of the system, at least cause the system to play back the IOCTLs in parallel for a plurality of compatible devices under test.

14. The system of claim 12, further comprising computer instructions that, upon execution by one or more processors of the system, at least cause the system to render an interface configured to allow a user to edit the IOCTLs.

15. The system of claim 12, further comprising computer instructions that, upon execution by one or more processors of the system, at least cause the system to render an interface configured to allow a user to merge the IOCTLs.

16. A computer-readable storage medium having computer-executable instructions stored thereupon which, when executed by one or more processors of a computing device, cause the computing device to perform operations comprising:
running a plurality of IOCTLs to cause specified actions for one or more device drivers running on a device under test, wherein the IOCTLs are configured from user space and the actions are executed in kernel space, wherein the device drivers are accessible via the IOCTLs, and the IOCTLs execute system calls for device-specific operations for the device under test;
recording IOCTLs that completed without generating an error and caused the driver to perform a specified function, thereby indicating that the specified function is installed and available in the device under test; and
storing the IOCTLs that completed without generating an error and associated binding information in a format usable for subsequent replay of the stored IOCTLs.

17. The computer-readable storage medium of claim 16, further comprising computer-executable instructions stored thereupon which, when executed by one or more processors of a computing device, cause the computing device to perform operations comprising recording I/O request packets that completed without generating an error.

18. The computer-readable storage medium of claim 17, further comprising computer-executable instructions stored thereupon which, when executed by one or more processors of a computing device, cause the computing device to perform operations comprising storing an input buffer length stored in the I/O request packets.

19. The computer-readable storage medium of claim 17, further comprising computer-executable instructions stored thereupon which, when executed by one or more processors of a computing device, cause the computing device to perform operations comprising storing an input buffer.

20. The computer-readable storage medium of claim 17, further comprising computer-executable instructions stored thereupon which, when executed by one or more processors of a computing device, cause the computing device to perform operations comprising storing an output buffer length stored in the I/O request packets and the output buffer.

* * * * *